(12) United States Patent
Hogan et al.

(10) Patent No.: US 9,963,939 B2
(45) Date of Patent: May 8, 2018

(54) DIRECT LASER ICE PENETRATION SYSTEM

(71) Applicant: Stone Aerospace, Inc., Del Valle, TX (US)

(72) Inventors: Bartholomew P. Hogan, Rockville, MD (US); William C. Stone, Del Valle, TX (US)

(73) Assignee: Stone Aerospace, Inc., Del Valle, TX (US)

( * ) Notice: Subject to any disclaimer, the term of this patent is extended or adjusted under 35 U.S.C. 154(b) by 0 days. days.

(21) Appl. No.: 15/495,916

(22) Filed: Apr. 24, 2017

(65) Prior Publication Data

US 2017/0370154 A1    Dec. 28, 2017

Related U.S. Application Data

(60) Provisional application No. 62/354,618, filed on Jun. 24, 2016.

(51) Int. Cl.
| | | |
|---|---|---|
| *E21B 7/15* | (2006.01) | |
| *E21B 49/00* | (2006.01) | |
| *G02B 27/30* | (2006.01) | |
| *G02B 7/02* | (2006.01) | |
| *G02B 27/09* | (2006.01) | |
| *G02B 6/42* | (2006.01) | |
| *G02B 23/24* | (2006.01) | |
| *G02B 23/26* | (2006.01) | |

(52) U.S. Cl.
CPC .............. *E21B 7/15* (2013.01); *E21B 49/00* (2013.01); *G02B 6/4296* (2013.01); *G02B 7/02* (2013.01); *G02B 23/2469* (2013.01); *G02B 23/2492* (2013.01); *G02B 23/26* (2013.01); *G02B 27/0955* (2013.01); *G02B 27/30* (2013.01)

(58) Field of Classification Search
CPC   E21B 7/15; E21B 49/00; G02B 27/30; G02B 27/0955; G02B 6/4296; G02B 7/02
USPC .......................... 219/121.65, 121.66, 121.61
See application file for complete search history.

(56) References Cited

U.S. PATENT DOCUMENTS

| | | | |
|---|---|---|---|
| 9,850,711 B2* | 12/2017 | Stone | ....................... E21B 7/008 |
| 2015/0253513 A1* | 9/2015 | Stone | ................... G02B 6/3604 385/26 |

* cited by examiner

*Primary Examiner* — Samuel M Heinrich
(74) *Attorney, Agent, or Firm* — Miguel Villarreal, Jr.; Gunn, Lee & Cave, P.C.

(57) ABSTRACT

An optically powered system for rapid, focused heating and melting of water ice. The optical wavelength is chosen to fall in a range where transmissivity through liquid water is higher than through ice. An alternative embodiment of the invention further comprises a length of fiber optic tether between source and output to allow for motion of the melt head. A further embodiment includes probing the ice using various sensing modalities exploiting the presence of the fiber in the ice, searching for biomarkers and characterizing the radiation/light environment for subsurface habitability, including photosynthetic potential and radiation environment as a source for energy.

20 Claims, 11 Drawing Sheets

DIRECT LASER ICE PENETRATION SYSTEM

CROSS REFERENCE TO RELATED APPLICATIONS

This original non-provisional application claims priority to and the benefit of U.S. provisional application Ser. No. 62/354,618 filed Jun. 24, 2016, and entitled "Direct Laser Ice Penetrator," which is hereby incorporated by reference herein.

STATEMENT REGARDING FEDERALLY SPONSORED RESEARCH OR DEVELOPMENT

This invention was made with Government support under Grant No. NNX15AT32G awarded by NASA. The Government has certain rights in the invention.

BACKGROUND OF THE INVENTION

1. Field of the Invention

The present invention relates to power transfer. More specifically, the present invention is a system for the transfer and use of optical energy to melt and penetrate water ice.

2. Description of the Related Art

Explorations of glaciers on Earth and subsurface exploration of ocean worlds ultimately requires significant ice penetration. Laser energy has been used in industrial application as a cutting and melting method for several decades. High-power laser cutters are commercially available and are used for cutting plastics, wood, and even metals with high precision in factory settings. Industrial cutting lasers, many powered by fiber lasers, have used a very short (typically less than ten meters in length) "process" fiber for transfer of the laser energy to a local cutting head adjacent the laser and in the same building. Such lasers are used for cutting plastics, woods, and at the highest powers, metals.

The concept of very high power transfer over very long distances has been previously investigated and patented by the inventors. However, that invention did not consider the direct use of the optical photonic energy to effect melting of ice, but rather converted the optical energy to thermal and electrical energy within a beam dump, after which this energy could be used for melting or cutting, albeit with conversion losses and other restrictions.

In the spring of 2016, the inventors began investigating the concept of using the output of a fiber laser with a specific wavelength of generated light to directly and efficiently melt ice for the purpose of enabling a test of a planetary ice-cap penetrating science vehicle for the investigation of the polar ice caps of Mars, as well as the ice shells of the Jovian moon Europa and Saturnian moon Enceladus. The concept was driven by a need to achieve higher melting rates and thus penetration speeds for an ice-penetrating probe or vehicle, as well as by a need to develop methods to efficiently penetrate ice in a vacuum.

Conventional hot point melt probes for probing glaciers and ice caps rely on conductive and convective transfer of heat to ice and any meltwater layer. Such probes tested under vacuum conditions as predominate on extraterrestrial ice masses have shown extreme difficulty initiating penetration, as there is virtually no thermal contact between the probe nose and rough ice surface. The ice simply sublimates and any transferred heat is quickly dissipated due to the low power density and extreme cold. With the direct laser heating which is the subject of this invention, no thermal contact is needed, and 100% of the laser power is deposited directly into the ice with no thermal handling losses regardless of the presence of atmosphere or vacuum. Thus direct laser melting has particular applicability to ice probes and cutters for use in planetary exploration.

Figure 1:
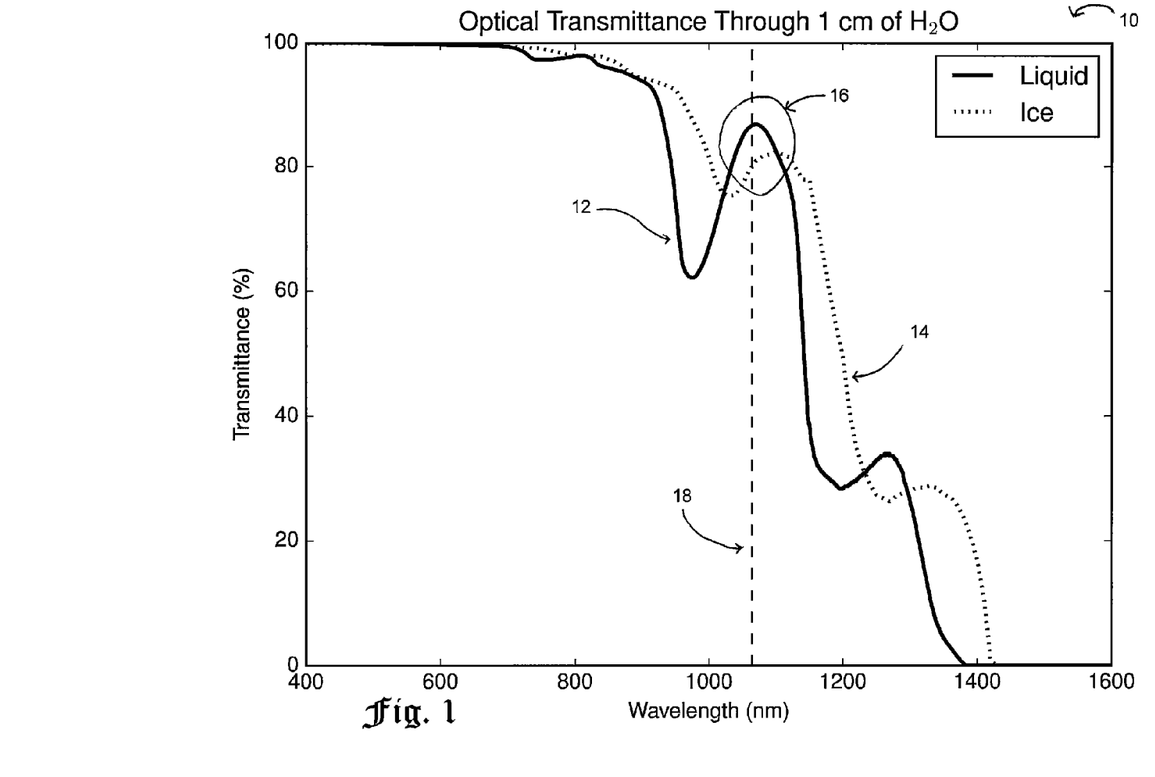
FIG. 1 shows a plot of the transmittance of optical power through one centimeter of liquid water and of ice as a function of wavelength.

Ice absorbs photons at different wavelengths in different ways. As some particular wavelengths, e.g., 1070 nm, water and water vapor will offer almost total transparency to a laser beam, but ice at that same wavelength will totally absorb the energy. Referring now to FIG. 1, a plot 10 is shown of the transmittance of optical power through one centimeter of liquid water and of ice as a function of wavelength. FIG. 1 shows transmission curves 12, 14 of light through both liquid water and frozen water (ice), respectively.

In general, liquid water absorbs optical energy more rapidly (thus has lower transmissivity). However, there exists a small range of wavelengths at which this relation is reversed. FIG. 1 shows that this situation exists near 1050 nm and 1370 nm in the falloff from transparency at visible wavelengths to opacity in the short-wavelength infrared. This means that high-power light at these wavelengths shone on ice will heat and melt the material, but will be minimally intercepted by meltwater accumulating between the light source and the ice. This leads to highly effective cutting of ice in a wide variety of potential applications. In particular, a melt head penetrating vertically down into ice can work efficiently even if meltwater does not drain from the melt hole.

FIG. 1 also shows that the area or region 16 near 1050 nm has the additional benefit that transmissivity is relatively high (over 70%), so that light can penetrate far into the ice before being completely absorbed. This area 16 is also attractive as standard high-power fiber lasers are designed for wavelengths in this region; high-power infrared cutting lasers with wavelengths in this range 16 (1064 nm) are available industrially. This wavelength is indicated in FIG. 1 with a vertical dashed line 18.

The unique property of 1070 nm laser light is that it has more absorption in ice than in water, which helps limit attenuation in any water pocket that may exist in front of the penetrator. As shown in FIG. 1, the wavelength 1070 nm has a significant "bump" (i.e., region 16) in the transmission curve that indicates a desirable increase in the transmission through water while the ice transmission curve has a desirable insignificant bump. The result is the 1070 nm travels through water with lower loss than traveling through ice, providing the desirable result.

The absorption rate for ice for shorter wavelengths, the water absorption gets greater (which is undesirable) and the ice absorption gets less (undesirable as well) hitting local maxima for water around 975 nm. At wavelengths longer than 1070 nm, the spectrum is not as favorable. However, at around 1265 nm there is another local maxima for water with a beneficial ice/water absorption ratio. The overall absorption, however, is significantly great at around 1265 nm which has its own challenges. Thus, wavelengths between 880 nm and 1270 nm can be utilized, though around 1070 nm is optimal for both the properties of ice and the availability of laser technology. Even longer wavelengths can be used, but the absorption in both ice and water will be extremely rapid leading to issues of overheating, steam, etc.

Figure 2:
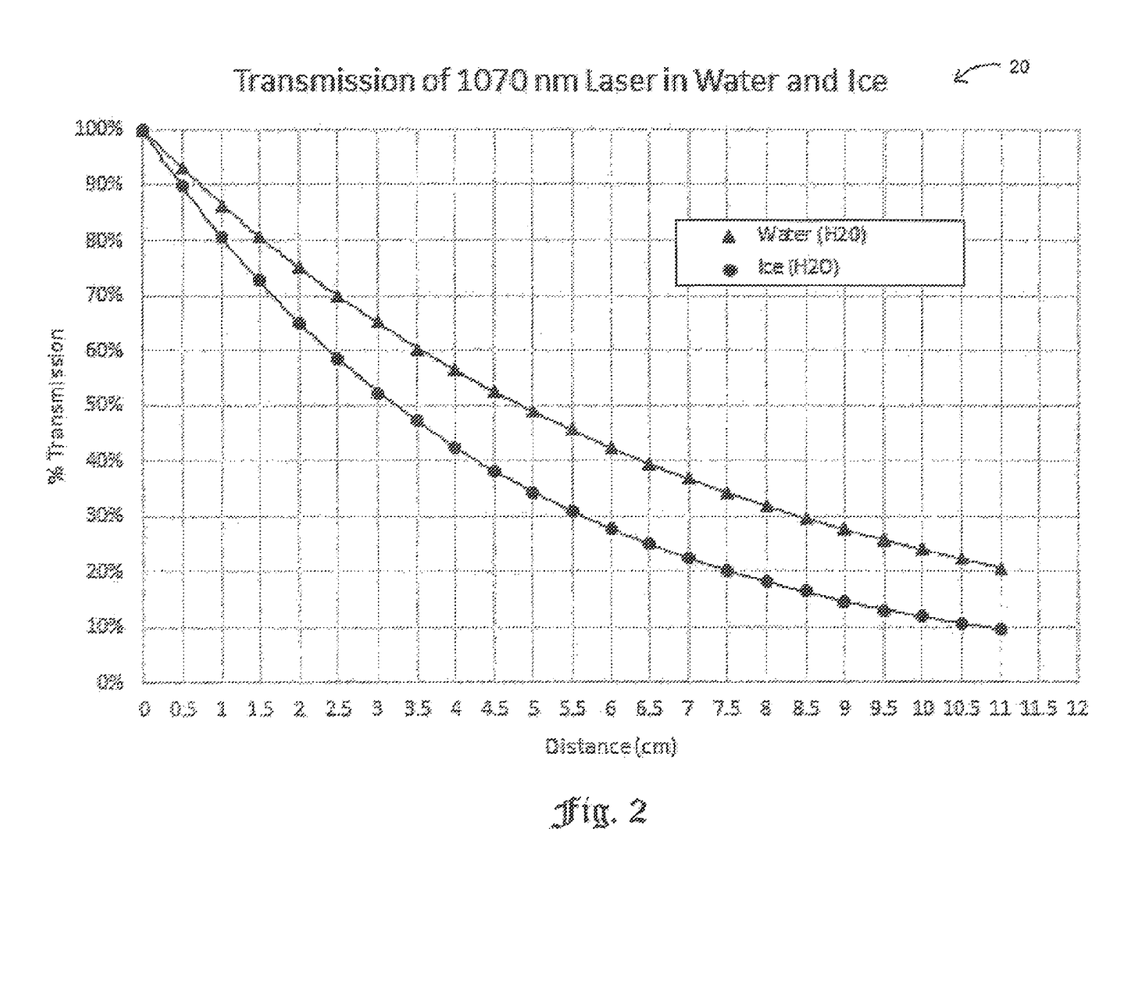
FIG. 2 is a plot of the transmittance of optical power with 1070 nm wavelength through liquid water and through ice as a function of penetration distance.

Referring now to FIG. 2, this shows the attenuation of laser light for one wavelength (1070 nm) in this region as the light penetrates ice. FIG. 2 is a plot 20 of the transmittance of optical power with 1070 nm wavelength through liquid water and through ice as a function of penetration distance. This figure shows that half of light power at this wavelength will be absorbed after 5 cm, so that light can travel 16 cm before 90% is absorbed. This allows for very high power light to be shone on ice and absorbed through a large volume of material without causing rapid spot heating.

The transmission/absorption data discussed above is for clear ice, but ice with cracks, crystals, air bubbles etc. will have a much higher absorption rate. This is generally favorable in the region near 1050 nm, since transmission is moderately high, and can be reduced to some extent without causing overheating.

A major benefit of depositing energy into a volume of ice, rather than upon a surface, is a lower resulting temperature for sampling compared to hot point probes, which must generate large temperature gradients to force the heat through layers of ice and water. During proof of concept testing, the inventors observed only moderate temperature rises at the ice-water interface, implying that samples will not be excessively heated.

The higher power densities made possible through direct laser melting at a selected frequency have particular benefit for penetrating cold (below 250 K) ice to great distances with a melt probe. The high power density makes possible faster penetration times, which is critical because power required to overcome conductive losses through a probe sidewalls quickly dominates at lower speeds. The faster the penetration, the lesser the portion of losses to conduction.

The inventors have found one report of a $CO_2$ laser (10,200 nm wavelength) used to melt ice. However, using this method, the water generated in the process of melting immediately absorbed the optical radiation, preventing further cutting unless the melt hole was drained by laying the ice block horizontal and drilling into the side. Through careful selection of the wavelength, the present invention allows much higher heating power to be deposited in the ice in a much more precise fashion, and thus allows for significantly faster, precise cutting in any orientation. Outside of this report, the inventors have found no prior art in the USPTO data base and have no knowledge of any designs, demonstrations or investigating into this invention.

In May 2016, the inventors conducted a high power laser melt test that utilized a five-kilowatt infrared fiber laser at a wavelength of 1064 nm wherein power levels from zero to four kilowatts were incrementally injected into a vertical ice probe with a pure silica window at the nose.

Figure 3:
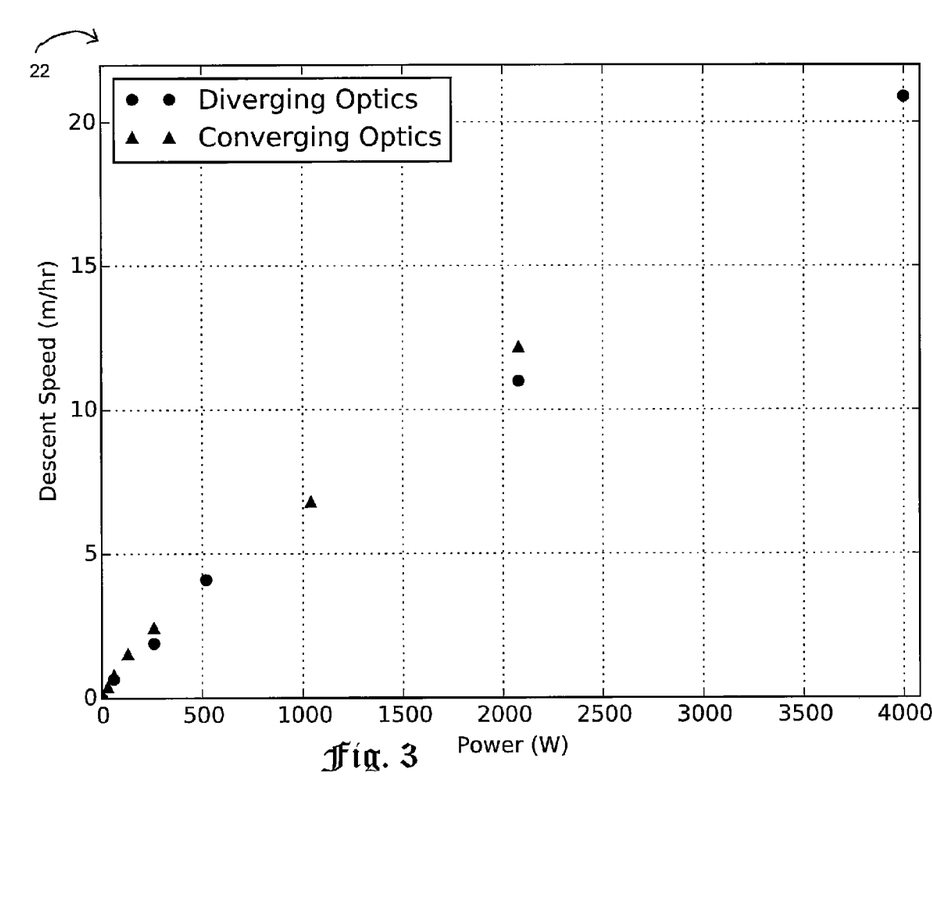
FIG. 3 is a plot that shows the results of a direct laser penetration test.

FIG. 3 is a plot 22 that shows the results of that test, which demonstrate extremely rapid penetration speeds for ice melt probes.

BRIEF SUMMARY OF THE INVENTION

The invention is an optical power ice heating and melting system comprising a laser source at a wavelength with particular transmission properties, and an optical waveguide and optics transferring the optical power into ice. An alternative embodiment of the invention further comprises a length of fiber optic tether between source and output to allow for motion of the melt head. A further embodiment includes probing the ice using various sensing modalities exploiting the presence of the fiber in the ice.

DETAILED DESCRIPTION OF THE INVENTION

Figure 4:
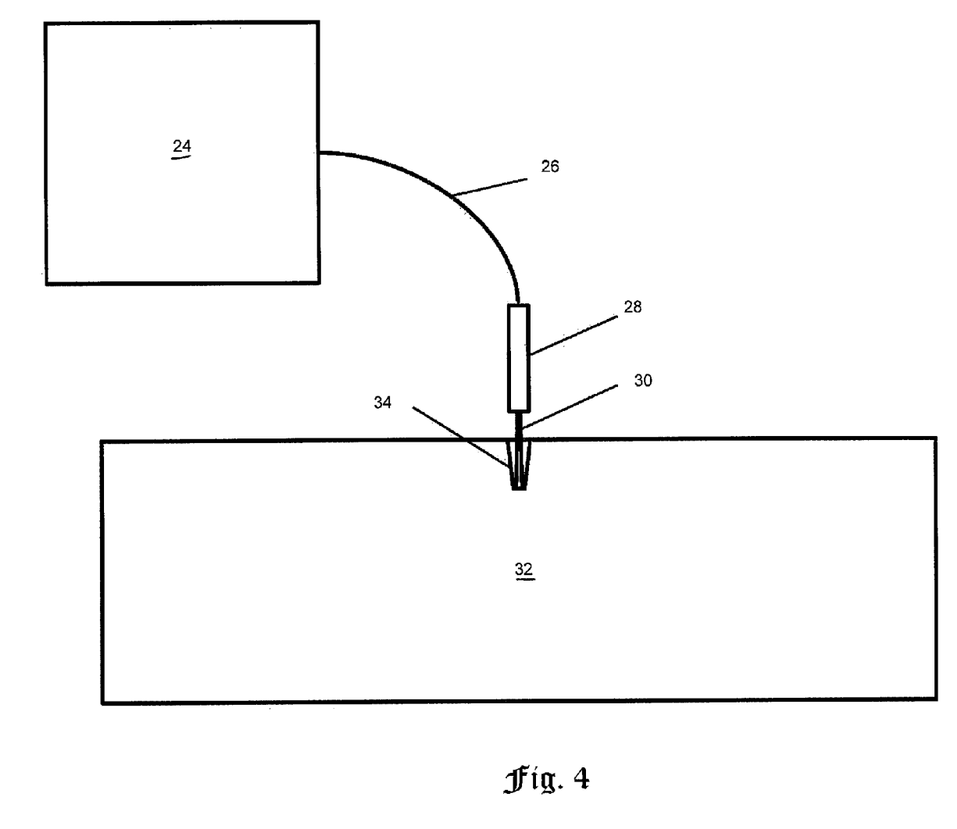
FIG. 4 shows a general schematic representation of the present invention.

FIG. 4 shows a general schematic representation of the invention. One or more laser sources 24 are used to generate a high-power optical beam of a wavelength in the optimal region 16 indicated in FIG. 1. This beam is directed either along an optical path or fiber 26 to a melt head 28 where the beam is expanded, collimated, and/or contracted to form a desirable output beam 30. This output beam 30 is directed by the melt head 28 at the ice mass 32 to be cut. Depending on the application, the melt heat 28 may be mechanically or otherwise manipulated to direct the output beam 30 and produce the desired cutting opening 34 in the ice mass 32. The melt head 28 may enter the ice mass 32, and in particular, may be guided to fall under its own weight into a vertical melt hole as a melt vehicle or probe (not shown).

Figure 5A:
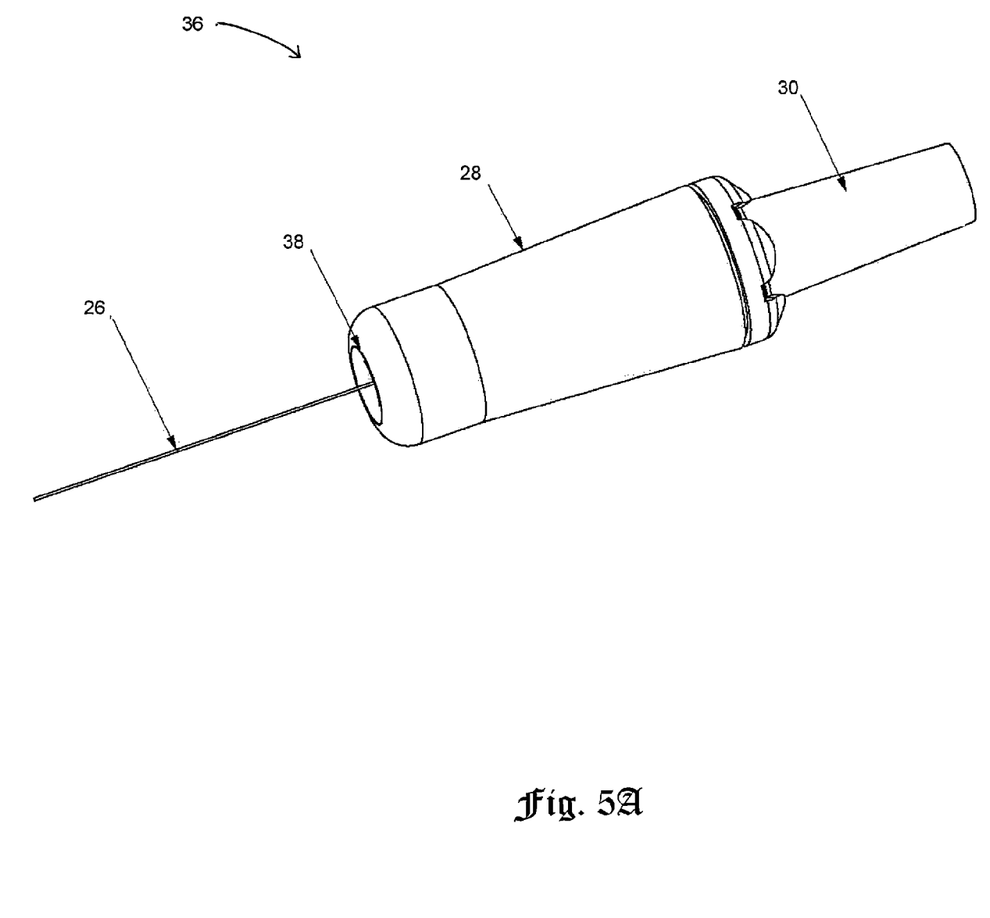
FIG. 5A shows the basic premise of a direct laser penetration melt head.

FIG. 5A shows an embodiment 36 of the present invention in which the melt head 28 is connected to the laser light source 24 (See FIG. 4) with a fiber optic tether 26. The fiber 26 enters the melt head body 38 through a trumpet opening 42 (see FIG. 5B) limiting the minimum bending radius of the fiber 26 to prevent excessive losses in the fiber 26 which would cause overheating and failure of the fiber 26. The melt head body 28 further contains optics (discussed below) to form the output beam 30 into the shape required for the desired type of heating, melting, and/or cutting. The output beam 30 has either low divergence to concentrate heating and melting in front of the melt head 28, or large divergence if a large ice volume is to be warmed or melted.

Figure 5B:
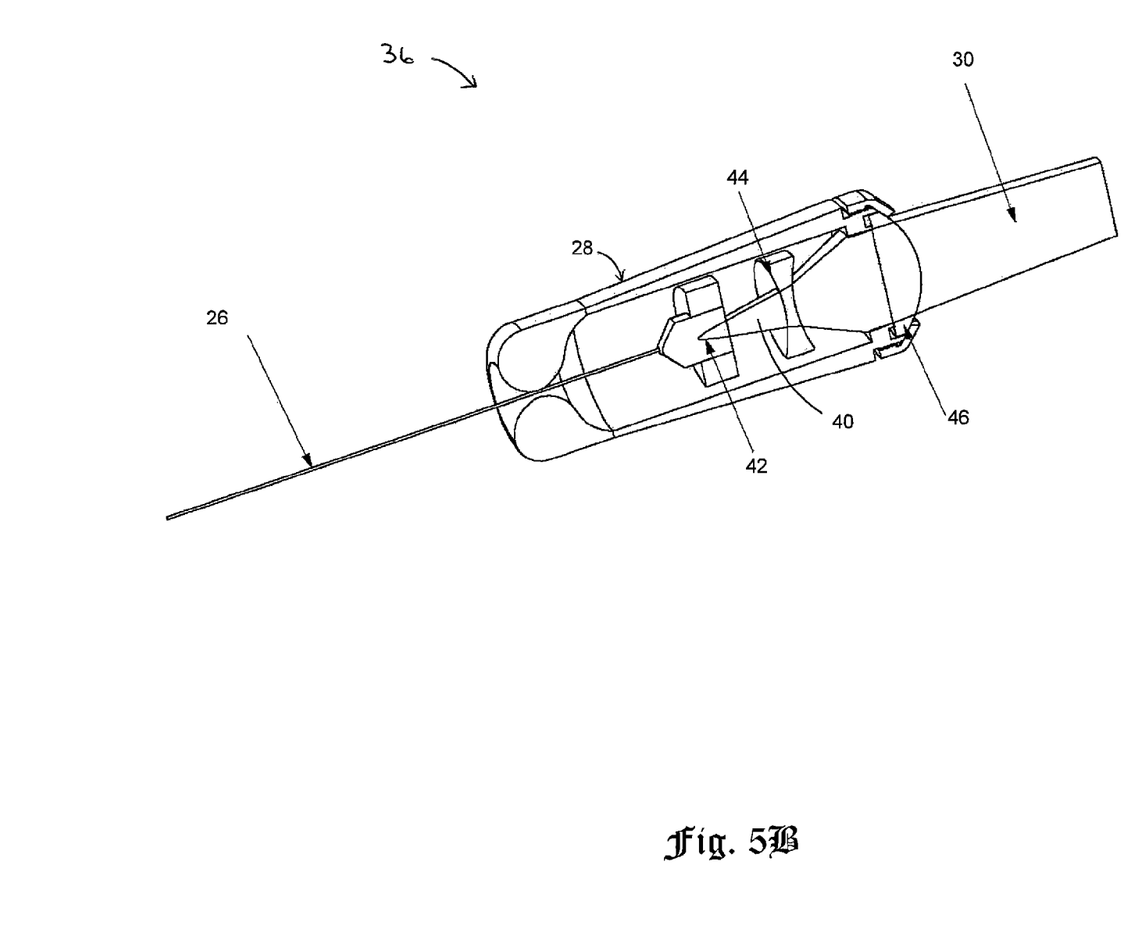
FIG. 5B shows a cut-away view of FIG. 5A.

FIG. 5B shows a cross sectional view of the melt head body 28 of FIG. 5A. The light beam 40 enters the melt head body 28 via the fiber 26. Inside the melt head body 28, the beam 40 exits the fiber 26 in the fiber termination block 42 and is expanded to the diameter of the melt head body 28 at a divergent double-concave optic 44. The beam 40 is then passed through a convergent plano-convex optic 46 to reduce the divergent angle of the output beam 30 after expansion. The combination of optics 44 and 46 set the divergence angle of the output beam 30. The convergent plano-convex optic 46 also serves as the output window of the melt head body 28.

Figure 6A:
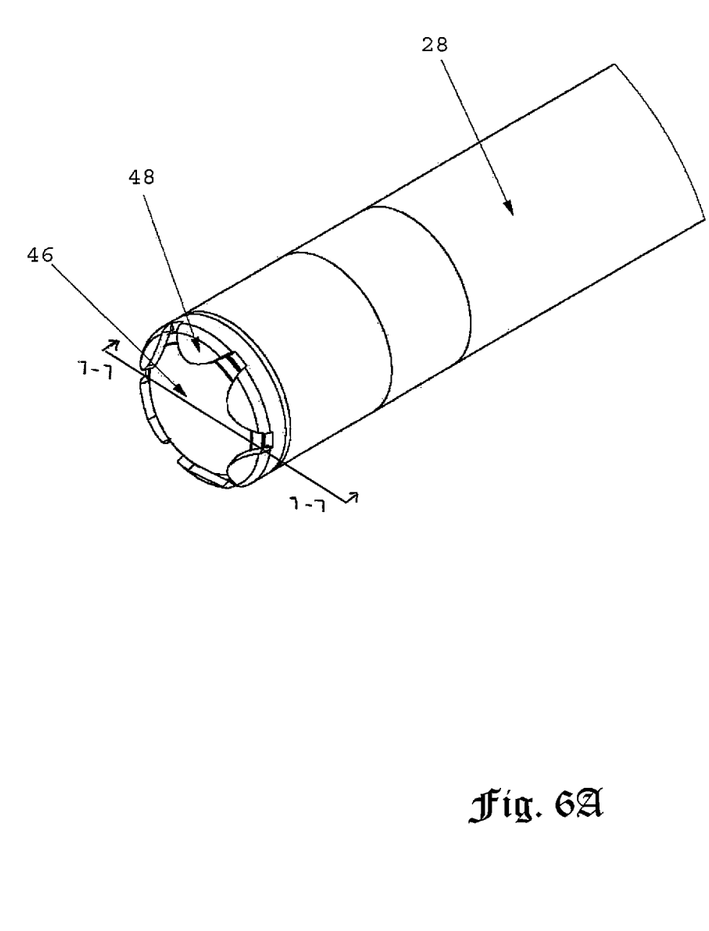
FIG. 6A shows a detail view of the nose of the melt head described with reference to FIG. 5A.

FIG. 6A shows the output end of the melt head body 28 of FIG. 5A. The melt head body 28 terminates in the output convergent plano-convex optic 46 which is held in place with a "castle nut" retainer 48.

Figure 6B:
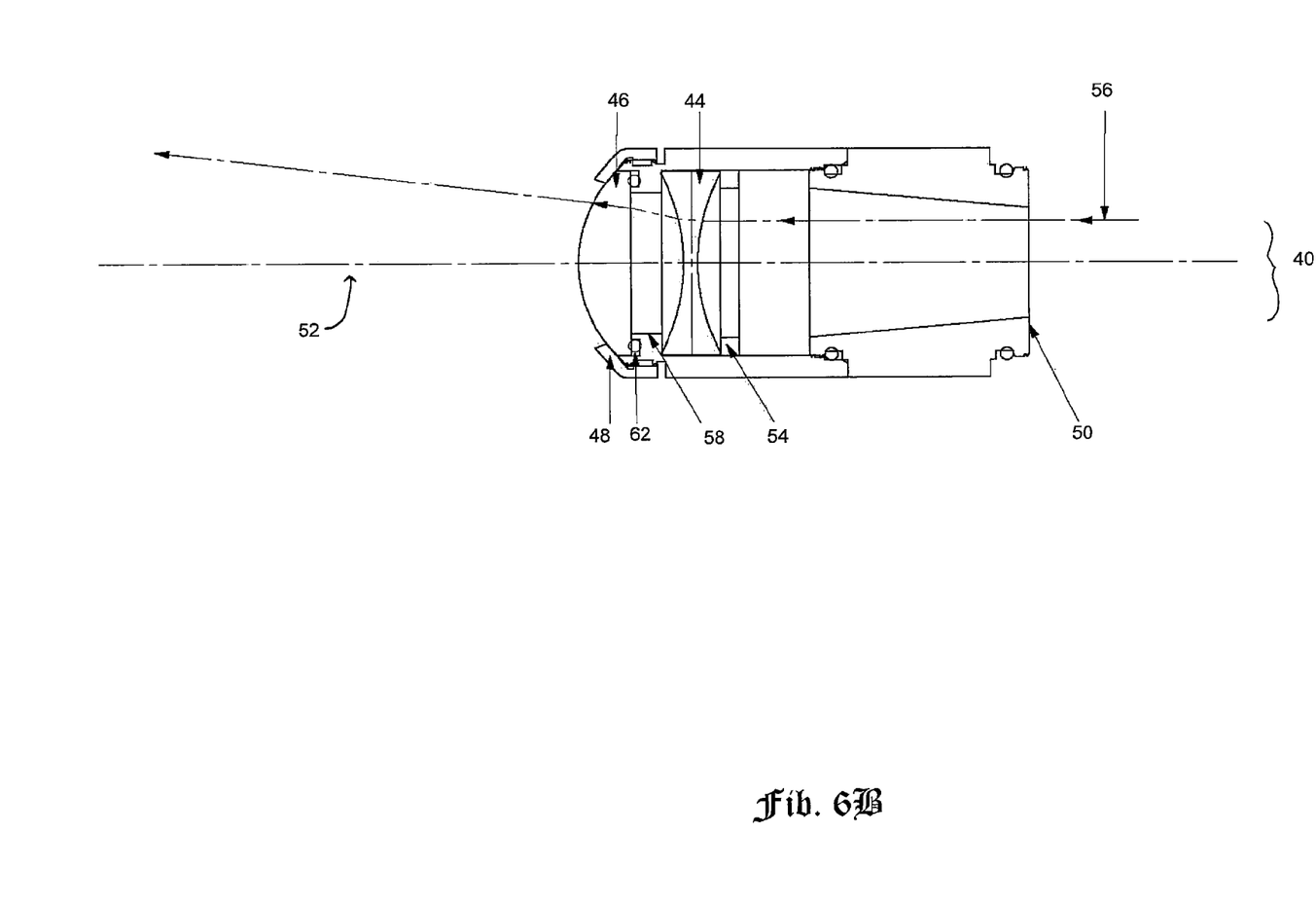
FIG. 6B is a cross sectional view of the melt head nose in FIG. 6A.

FIG. 6B shows a cross sectional view of the output end in FIG. 6A. Here, the beam 40 coming from the laser or fiber output (not shown) first encounters a hard aperture 50. This serves to "scrape off" the outer fringe of the laser output which generally follows a bell-shaped pattern of intensity with maximum along the beam centerline 52 and trailing off around the perimeter. This "scraping" serves both to sharpen the edge of the melt head output beam 30 (e.g., FIG. 5A), resulting in a cleaner, more well-defined cut; to reduce inefficient heating in the optics allowing for higher output power; and to provide some heat to the melt head body 28, allowing the melt head body 28 to penetrate the ice without freezing in. The scraped beam is next expanded at the double-concave optic 44 held in place with retaining ring 54. The scraped beam then passes through the plano-convex optic 46 which reduces the divergent angle. Ray 56 traces the path of a single exemplar light ray through the melt head optics.

As described above, the present invention spreads the beam into a large uniform flux to reduce hot spots and also to collimate the edges of the beam to generate a more uniform beam. An object of the present invention is to expand the beam and have a low divergence. If the beam is diverging rapidly, it will expand outside the melt hole envelope, resulting in a waste of that energy. A small amount is acceptable to warm the surrounding ice but is necessarily limited to keep efficiency high.

Several features of the melt head body 28 are important to proper functioning of the embodiment of FIG. 6B. The divergent double-concave optic 44 and convergent plano-convex optic 46 are made to maximally transmit light of the beam wavelength, so that absorption and reflections are minimized. For example, they can be made of laser-grade fused silica, and both surfaces of optic 44 and the surface of optic 46 which faces the melt head interior can be coated with an anti-reflective (AR) coating such as a 1064 nm V coat. Such a configuration will reduce the power losses in the melt head optics to less than 0.2%. The interface between optic 46 and the ice meltwater at the exterior can be uncoated as Fresnel reflection at a silica-water boundary will be around 0.21% at the beam wavelength. In addition, the interior surface 58 between optic 44 and optic 46 is diamond cut or polished to create a reflective beam-shaping collimator 60, which reduces loss to the melt head wall and results in a more uniform and collimated output beam 30.

It is also important to reduce reflection caused by impurities or inclusions, such as water drops in the melt head interior or air or vapor bubbles on the exterior of the output window 46, as these can also cause intense spot heating and failure. The seam between the output convergent plano-convex optic 46 and the melt head body 28 is sealed with a high-temperature O-ring 62 (for example, a Kalrez® O-ring or the like) to accommodate the heat generated in the optic 46 without allowing melt water to leak in and cause errant reflections and spot heating which could destroy the melt head body 28. The output optic 46 is further held in place with the "castle nut" retainer 48.

Figure 7:
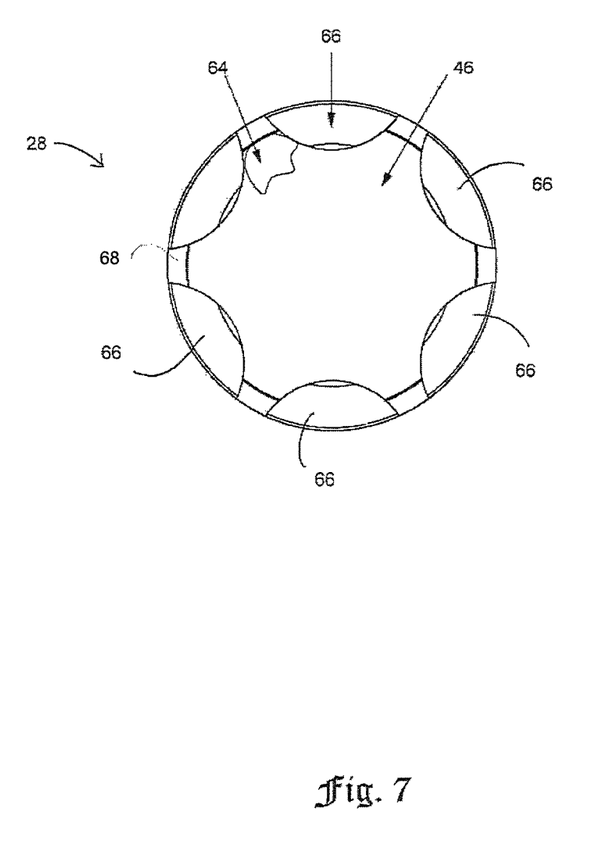
FIG. 7 shows a front view of the melt head nose optics with a castle nut retainer for the output window.

FIG. 7 shows an end view of the melt head body 28 of FIG. 6A, demonstrating the function of the output window 46 and retainer 48. If the melt head body 28 is held in a vertical orientation (for example, when used as a gravity penetrator probe), bubbles 64 on the output optic 46 will flow up along the convex outer surface and could become trapped along retaining ring 68 and cause dangerous reflections of the output beam 30. To prevent this, retaining ring 68 is designed with rounded fingers 66—together which make up "castle nut" retainer 48—separated by slots allowing bubbles 64 to flow up past the melt head nose while the output optic 46 is secured in place.

In an alternative embodiment, an "external beam dump" is created by extending the edges of the nose such that the laser would intercept the edges after traveling in the ice/water. The purpose of the "tube" projecting in front of the final optic is to contain the laser energy preventing spread beyond the envelope of the vehicle (when employing a divergent beam), where such spread would not assist penetration. This external beam dump absorbs the laser radiation and helps with penetration. The external beam dump includes flow holes/slots for good water/air flow to escape from around the nose/final optic. This absorptive "shade" collects any highly divergent light near the nose of the vehicle. Rays further away are less of an issue as they will be attenuated through the ice and water.

Figure 8:
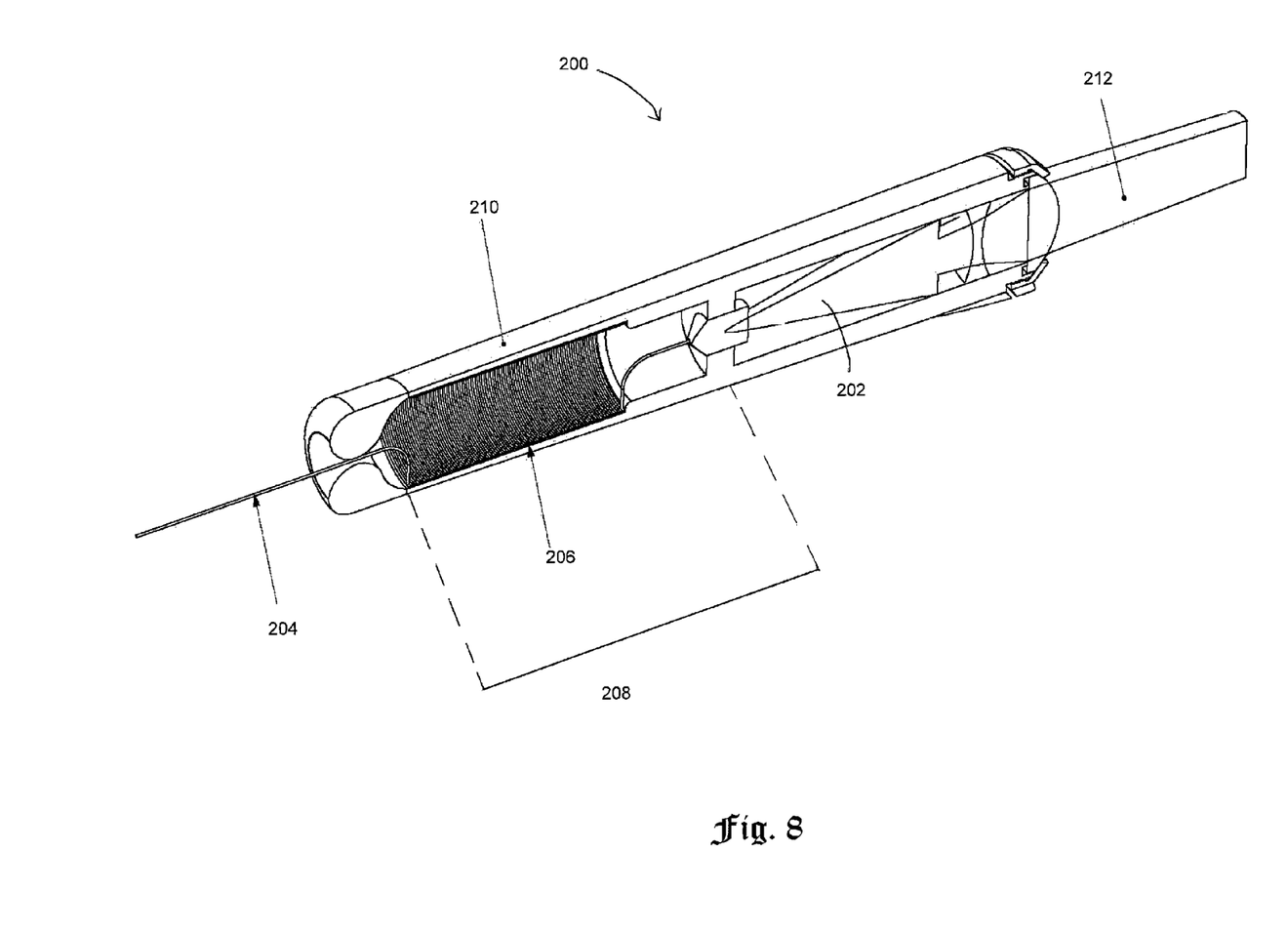
FIG. 8 shows an embodiment of the system employing an on-board fiber spool to allow for ice melting at considerable distance from the laser source.

FIG. 8 shows an alternate embodiment 200 of the present invention. The input beam 202 is carried in a fiber optic tether 204, which is deployed from precision-wound spool 206 contained in an extension 208 of the melt head body 210. Such a melt head body 210 can be deployed hundreds or thousands of meters away from the laser power source (not shown) and form a highly-mobile cutting unit. For example, such a melt head body 210 can be deployed as a ice penetrator probe to travel into terrestrial or extra-terrestrial glaciers, ice shelves, ice caps, or ice shells powered by a large laser source (from 10 W to 10 MW) at the surface.

The optical fiber 204 can also be used as an intrinsic sensor of properties of the ice through which the melt head body 210 has passed. Properties which can be sensed include the temperature distribution along the fiber length, the distribution of mechanical strain in the ice along the fiber length, the pressure distribution in the ice along the fiber length, seismic and sonar acoustic waves passing by the fiber, and ambient light encountered by the melt head body 210 during descent.

Figure 9:
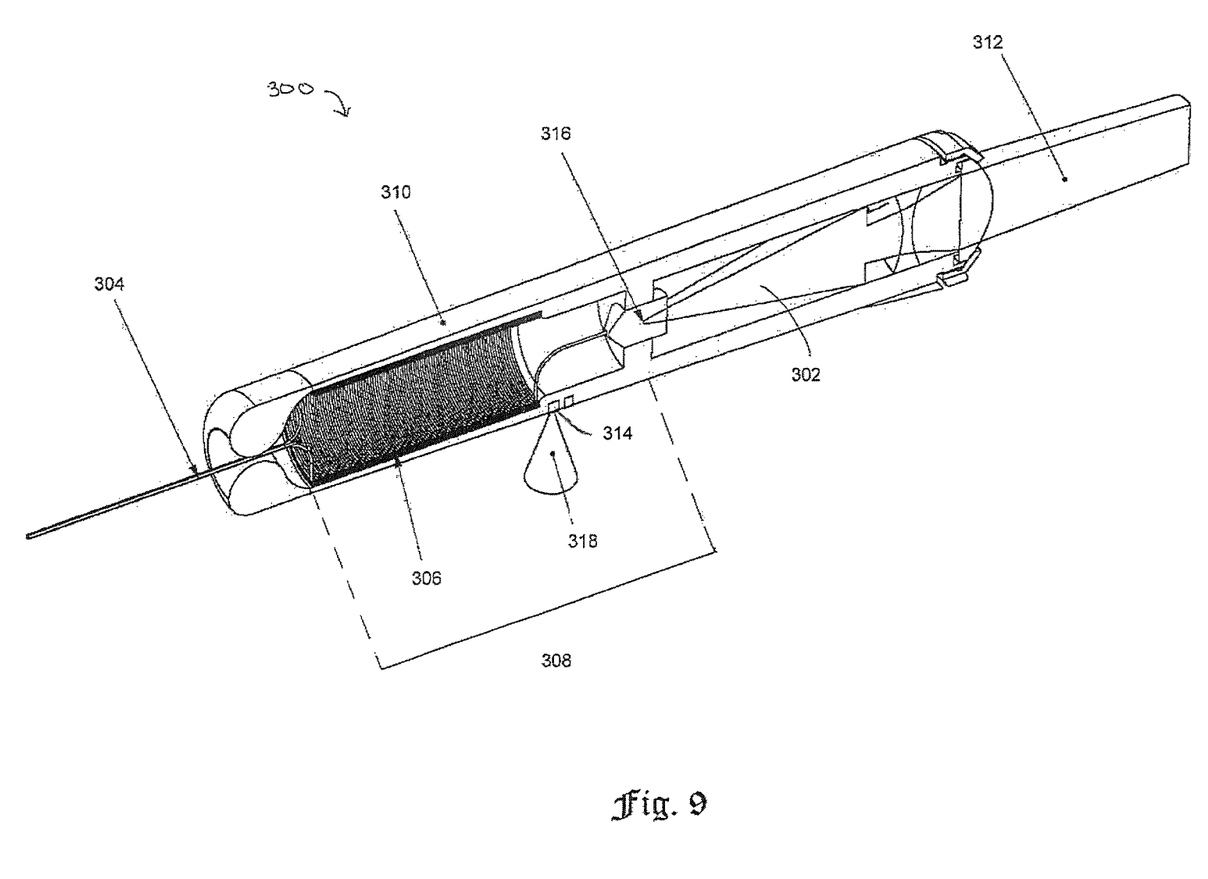
FIG. 9 show an embodiment of the system in FIG. 8 also including an external port for remotely probing the ice surrounding the melt head with sensing modalities using the fiber as a transport medium.

FIG. 9 shows an alternate embodiment 300 of the present invention, which includes a fiber-coupled remote optical sensor 314 such as a Raman, fluorescence, or UV/VIS/NIR spectrometer. The input tether 304 contains three fibers, which are "expansion spooled" into the spool bay 306. One fiber carries the high-power cutting beam, and connects to the fiber termination block 316 as in the embodiment of FIG. 5B. Another fiber carries an excitation beam 318 for the remote sensor, which exits the melt head body 310 at the desired probing location. The sensed signal is accumulated and returned to the surface in the third fiber of tether 304.

The present invention is described in terms of a preferred illustrative embodiment and alternative embodiments of specifically-described apparatuses and systems. Those skilled in the art will recognize that yet other alternative embodiments of such apparatus and systems can be used in carrying out the present invention. Other aspects, features, and advantages of the present invention may be obtained from a study of this disclosure and the drawings, along with the appended claims.

We claim:

1. An optically powered ice heating and melting system comprising:
   a laser power source with output at wavelengths where transmission through water is higher than through ice;
   a waveguide and optics to direct a light beam to the ice material to be heated and/or melted;

a melt head body having an aperture at one end for receiving said beam, said melt head body connected to an end of said waveguide to allow for manipulation of said beam;

an optic retaining ring within said melt head body;

first optics secured by said optic retaining ring;

second optics in optical communication with said first optics;

a collimator positioned between and in optical communication with said first and second optics;

an O-ring positioned between said collimator and said second optics, said O-ring configured to withstand high-temperatures; and a retainer for securing said second optics within the other end of said melt head body.

2. The system of claim 1 further comprising a high-powered fiber coupler for receiving said output beam, said high-powered fiber coupler positioned between said laser power source and said melt head body.

3. The system of claim 2 wherein said melt head further contains expanding and collimating optics to generate a desired output beam shape.

4. The system of claim 3 wherein said first optics is a divergent double concave optic.

5. The system of claim 4 wherein said second optics is a convergent plano-convex optic.

6. The system of claim 5 wherein said first and second optics are laser-grade fused silica.

7. The system of claim 6 wherein said first and second optics have an anti-reflective (AR) coating of 1064 nm V coat.

8. The system of claim 3 wherein said collimator is reflective.

9. The system of claim 8 wherein said second optics is the output optic.

10. The system of claim 9 wherein said retainer has rounded fingers along the perimeter of said output optic and extend centrally to said output optic, said fingers separated by slots.

11. The system of claim 10 further comprising a beam dump external to said melt head body.

12. The system of claim 11 in which said melt head body further comprises a fiber spooler.

13. The system of claim 12 wherein said optical fiber is used to sense properties of the ice traversed by said melt head body.

14. The system of claim 13 further comprising at least one optical fibers bundled with said optical fiber to transport excitation and sensing signals for a fiber-coupled remote sensor.

15. The system of claim 14 wherein said fiber-coupled remote sensor is a fluorescence spectrometer.

16. The system of claim 14 wherein said fiber-coupled remote sensor is a Raman spectrometer.

17. The system of claim 14 wherein said fiber-coupled remote sensor is an absorption spectrometer.

18. The system of claim 14 wherein the range of wavelengths of said output beam is between 880 nm and 1270 nm.

19. The system of claim 18 wherein the range of wavelengths of said output beam is between 975 nm and 1070 nm.

20. The system of claim 19 wherein the wavelength of said output beam is 1070 nm.

* * * * *